July 17, 1956    C. A. LEASE ET AL    2,755,433
APPARATUS FOR COLLECTING AND QUANTITATIVELY
MEASURING PARTICLES
Filed Sept. 7, 1954
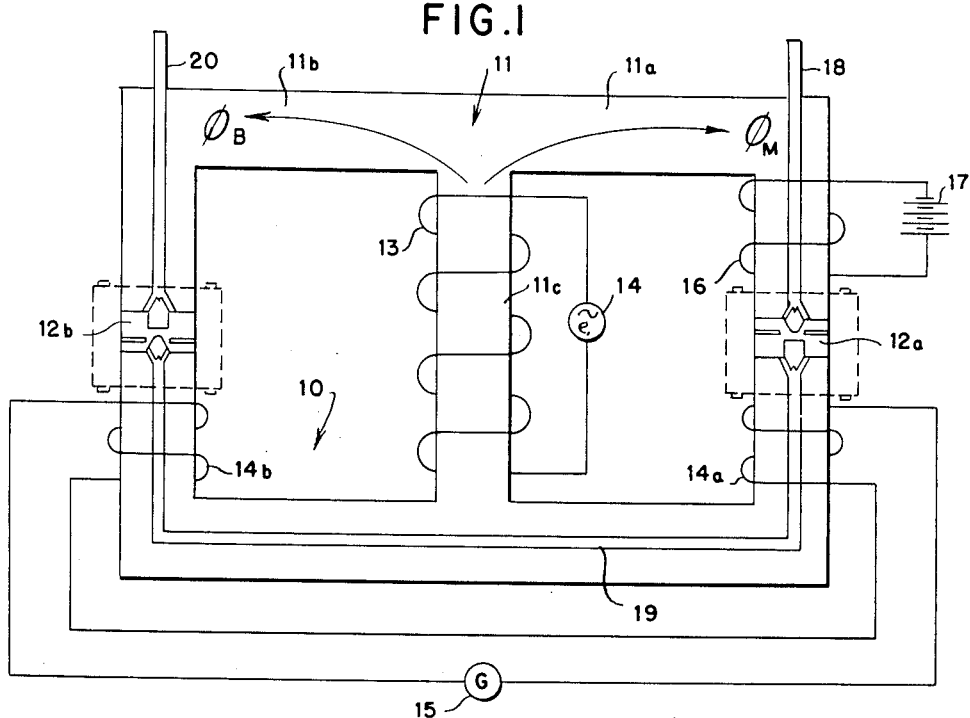
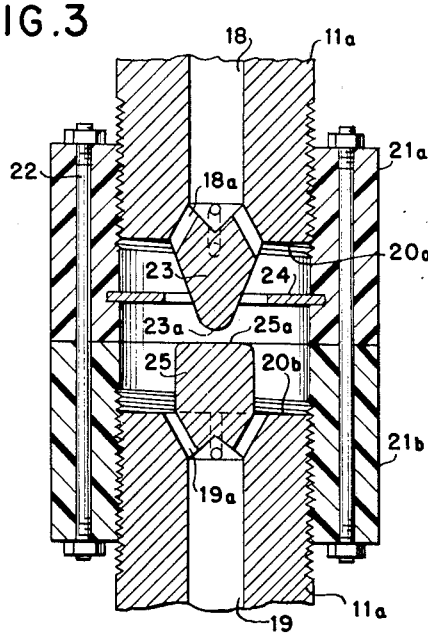
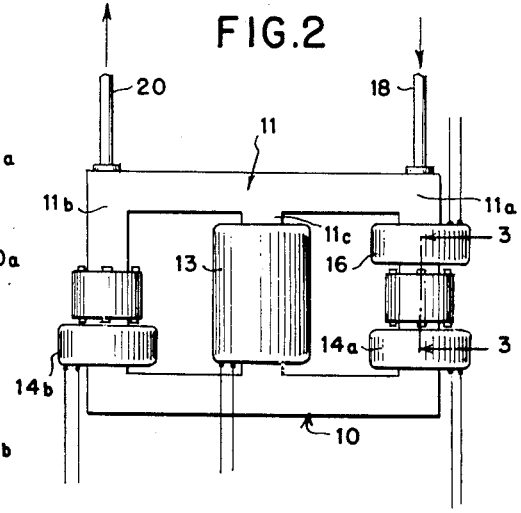
*INVENTORS*
CHARLES A. LEASE
HENRY M. MUSAL JR.
BY
*Adams, Forward & McLean*
ATTORNEYS

United States Patent Office 2,755,433
Patented July 17, 1956

2,755,433

APPARATUS FOR COLLECTING AND QUANTITATIVELY MEASURING PARTICLES

Charles A. Lease and Henry M. Musal, Jr., Chicago, Ill., assignors, by mesne assignments, to Sinclair Research Laboratories, Inc., Harvey, Ill., a corporation of Delaware Application September 7, 1954, Serial No. 454,529

5 Claims. (Cl. 324—41)

Our invention relates to measurement of wear of lubricated machine and engine parts which are constructed of iron or similar magnetic materials. In particular, our invention provides an apparatus for collecting and quantitatively measuring particles which are worn from moving machine and engine parts by carrying them off in the lubricant, for example, in engine crankcase oil, and by collecting them in a gap of a core carrying a magnetic flux circuit. The resultant change in reluctance of the circuit produced by such collection of particles in the gap is thus a measure of the quantity of particles.

In the design of machine and engine parts and in the formulation of lubricants, there exists a substantial need for a device for quantitatively determining wear of parts in frictional moving contact. The instruments which have heretofore been available have been subject to a number of disadvantages since they either require special construction of parts, e. g., containing radioactive materials, disassembly of the machine in order to make measurements of wear, damage to the machine or temporary laboratory installations. The results are often limited to wear indication for a particular isolated part, and the use of a new machine or part is often required for each test.

It is the primary object of our invention to provide a wear indicating instrument for lubricated engines and machines in which evaluation of the amount of wear is quantitative, in which the machine need not be disassembled to take measurements, in which any machine, whether stock or specially constructed and whether new or old, can be tested provided that it has iron, steel or other magnetic material wear surfaces, in which an average wear indication for the entire lubricated structure is obtained, in which no special treatment of any of the machine parts is necessary before or after testing, in which there is no damage to the machine other than by wear and in which measurements may be made not only in the laboratory but in the field and in permanent as well as temporary installations.

These and other objects of our invention are accomplished by measuring the magnetic powder or dust formed by wear of the moving parts and carried off in the lubricant, utilizing a differential transformer having two magnetic flux circuits energized by a primary coil driving two separate secondary windings which are connected to cancel induced voltage across the input terminals of a galvanometer or other measuring or indicating or recording instrument or circuit. The differential transformer is operated by passing the lubricant stream through a gap in one flux circuit while a direct current voltage is applied to collect the wear particles by magnetic attraction in the gap and thereafter by passing the lubricant stream free of wear particles through a gap in the second flux circuit of the differential transformer. Thus where the air gaps are adjusted initially to equalize induced voltage in the secondary windings and produce a null reading on the galvanometer or other indicating instrument, subsequent passage of lubricant through the gaps and collection of worn particles in the first gap changes the reluctance ratio of the magnetic flux circuits consequently changing the ratio of the induced voltages in the secondary windings such that a differential voltage is produced which is a function of the amount of worn particles collected in the first gap. The galvanometer or other indicating device connected with the secondary windings thus provides a quantitative indication of the total wear in the machine from which the lubricant is withdrawn.

Preferably, the lubricant is continuously withdrawn from the machine, passed through measuring gaps and then returned to the machine much in the same manner that engine crankcase oil is withdrawn through an oil filter and then recycled to the crankcase. By this means continuous indication of wear in a machine or engine in continuous operation is feasible. The measuring device could be utilized in a system for indicating impending mechanical failure of metallic parts when such failure is accompanied by the detachment of metal particles from the main structure. Applied to internal combustion engines a rapid rise in the wear rate would be an indication of conditions leading to structural failure of component parts. It is apparent that the measuring device of our invention is not limited to liquid lubricants and measure of wear but can also be utilized to measure the proportion of magnetic powder or dust which may be present in a gas stream.

For a more complete understanding of the practical application of the principles of our invention, reference is made to the accompanying drawing in which:

Figure 1 is a schematic diagram of a device constructed in accordance with our invention;

Figure 2 is a plane view of an actual apparatus of the type designated by the schematic in Figure 1; and Figure 3 is a cross-sectional view taken at line 3—3 in Figure 2 showing the construction of the gap for collection of particles. In the drawing, measuring instrument 10 includes a magnetically permeable core 11 having two loops 11a and 11b, connected to a common leg 11c, which loops contain gaps 12a and 12b, respectively. Gap 12a is shown in enlarged cross-section in Figure 3. Gap 12b is similar to gap 12a in construction and differs therefrom only in that the magnetic forces described hereinafter acting upon gap 12a differ from those acting upon gap 12b.

A primary coil 13 connected to a source of alternating voltage 14 is positioned about the common core portion 11c to produce a magnetic flux when energized in core portion 11c which is divided into two circuits through loops 11a and 11b. A pair of secondary windings 14a and 14b are positioned about the independent core loops 11a and 11b, respectively, in such a manner that energization of coil 13 will induce a voltage in each of coils 14a and 14b. Coils 14a and 14b are connected externally in series such that induced voltages tend to cancel each other out. The circuit including coils 14a and 14b is completed by a galvanometer 15 for indicating the differential voltage induced in coils 14a and 14b, if any. Independent core portion 11a is further provided with a second primary winding, coil 16, which is connected externally to a D. C. power supply 17.

A fluid conduit 18 is connected to lead the fluid to be tested into gap 12a. A second conduit 19 is connected to withdraw the fluid being tested from gap 12a and to introduce the fluid from gap 12a into gap 12b. Conduit 20 is utilized to withdraw fluid from gap 12b. Suitably conduit 18 is connected to the discharge side of the crankcase oil pump (not shown) of an internal combustion engine (not shown) and conduit 20 is connected to the suction side of the same pump, suitable valves (not shown) being provided to regulate the flow of lubricant through gaps 12a and 12b.

The construction shown in Figures 1 and 2 in which conduit 18 leads into the center of core portion 11a and conduit 20 leads from the center of core portion 11b while conduit 19 passes centrally through both such core portions is for illustrative purposes only. Any other suitable conduit construction entering and leaving each gap could be utilized. The construction of gap 12a, however, must be carefully designed to insure complete collection of the wear particles between the pole faces in an area of high flux density. The construction of gap 12b is preferably magnetically and electrically identical; for the function, as later explained, of gap 12b is primarily that of canceling out changes in circuit parameters which can be caused by effects other than the wear of metal.

Referring more particularly to Figure 3, the construction of gap 12a (and since gap 12b is identical, of gap 12b) is illustrated in complete detail. Independent core portion 11a is divided by gap 12a into a pair of confronting poles 20a and 20b between which the gap properly can be said to exist.

Poles 20a and 20b are enclosed by a pair of collars 21a and 21b which threadedly engage the exterior end portions of poles 20a and 20b respectively. Collars 21a and 21b are constructed of a resinous synthetic material which is impermeable (high reluctance) and which is inert to the fluids to be passed to gap 12a. Collars 21a and 21b are threaded down to abut each other between poles 20a and 20b and by suitable tie rods 22 are bolted together in closed fluid-tight contact, thus completely enclosing the space between poles 20a and 20b.

Pole 20a, into which inlet connection 18 centrally passes, is terminated at gap 12a in a tapered extension 23 having a rounded point 23a. Inlet connection 18, by a series of laterally extending passages 18a terminating at the base of extension 23, communicates with the interior of gap 12a. A flat annular ring 24, also of magnetically impermeable and chemically inert material, is positioned coaxially within collar 21a, being received peripherally by a groove about the interior of collar 21a and thus is coaxially positioned about pole extension 23. The clearance between annular disc 24 and extension 23, and the longitudinal position of disc 24 with respect to extension 23 are adjusted to provide a nozzle effect directing fluids charged through conduit 18 to be converged and directed beyond the tip 23a of extension 23.

Pole face 20b is provided at its terminal end within gap 12a by a coaxial cylindrical extension 25 facing extension 23 on pole 20a. The diameter of extension 25 is approximately that of the diameter of extension 23 at its base and is substantially greater than the transverse diameters of extension 23 approaching its rounded tip 23a. The end 25a of extension 25 which faces tip 23a of extension 23 is flat and located in a plane substantially perpendicular to the axis of gap 12a and is positioned to intercept the bulk of the stream flowing from the nozzle formed by extension 23 and annular disc 24 at a point in which such stream is sharply converged.

Conduit 19 which extends centrally from pole 20b to gap 12b is communicated with gap 12a by a series of laterally extending passages 19a leading into the terminal face of pole 20b at the base of extension 25.

From the preceding discussion it will be apparent that both gaps 12a and 12b are geometrically, electrically and magnetically symmetrical about an axis and are enclosed in non-magnetic, non-metallic fluid-tight cells which are identical in structure but differ in function. Thus the cell enclosing gap 12a is a measuring cell and the cell enclosing gap 12b is a balancing cell. Similarly, winding 14a is a measuring winding and winding 14b is a balancing winding. These windings can be connected externally as shown in Figure 1 or they can be connected in a bridge circuit or other indicating circuit for measuring the differential induced voltages in such windings.

In operation, the fluid to be measured, in the illustrated case a lubricant, passes through the measuring cell first and then through the balancing cell. Winding 13 is connected to a source of suitable alternating voltage $e_1$ of a frequency of 60 cycles per second which can be supplied in an automobile by a vibrator power pack of conventional design. The exact frequency, of course, which is to be used can be selected as desired and core design, material and the size of windings would necessarily be dependent upon the frequency and voltage selected. These design choices have no bearing on our invention, and their selection is routine practice for the electrical engineer. The voltage $e_1$ impressed upon coil 13 will produce an alternating magnetic flux in center leg 11c as given by the equation:

(1) $$(\phi_B + \phi_M) \text{ max.} = \frac{E_1}{4.44 f N_1}$$

where $\phi_B$ = balancing flux
$\phi_M$ = measuring flux
$E_1$ = rms value of $e_1$
$f$ = frequency
$N_1$ = number of turns in the coil This magnetic flux has two possible paths of circulation, one through balancing leg 11b of core 11, the other through measuring leg 11a of core 11. The ratio of the two components, $\phi_B$ and $\phi_M$, is equal to the inverse ratio of the respective magnetic reluctances of the two paths, as given by:

(2) $$\mathcal{R}_B = \frac{\delta_B}{\mu_0 A_0} + \frac{l_B}{\mu_c A_c}$$

(3) $$\mathcal{R}_M = \frac{\delta_M}{\mu_0 A_0} + \frac{l_M}{\mu_c A_c}$$

where $\mathcal{R}_B$ = balancing reluctance
$\mathcal{R}_M$ = measuring reluctance
$\delta_M$ = length of gap 12a
$\delta_B$ = length of gap 12b
$l_M$ = length of core 11a + leg 11c
$l_B$ = length of core 11b + leg 11c
$\mu_0$ = permeability of fluid in gaps 12a and 12b
$\mu_c$ = permeability of core 11
$A_0$ = cross-sectional area of the gaps
$A_c$ = cross-sectional area of the magnetic core 11 along either path (4) $$\frac{\phi_M}{\phi_B} = \frac{\mathcal{R}_B}{\mathcal{R}_M}$$

Under the initial symmetrical conditions, (5) $$\mathcal{R}_B = \mathcal{R}_M$$

and thus:

(6) $$\phi_M = \phi_B$$

The two equal fluxes, $\phi_M$ and $\phi_B$, traversing the cells induce voltages in measuring winding 14a and balancing winding 14b, as given by:

(7) $$E = 4.44 f N \phi \text{ max.}$$

The voltages induced are equal in magnitude due to the equal fluxes and symmetrical windings. Measuring winding 14a and balancing winding 14b are connected in series opposition, causing the net voltage output to be zero. The purpose of the balancing winding is to cancel out any change in the circuit parameters caused by any effect other than the wear metal. The alternating magnetic flux traversing gaps 12a and 12b has no net effect on the metal particles in the fluid medium in the gaps.

Winding 16, which is energized by a direct current, sets up a direct flux which traverses measuring gap 12a, loop 11a and center core leg 11c but does not traverse loop 11b or balancing gap 12b due to the reluctance ratio. This direct collection flux exerts a force on any magnetic particles suspended in the fluid medium, drawing them into contact with the surfaces of pole pieces 23 and 25 in gap 12a and holding them there. The magnitude of this force is given by the equation:

(8) $$F=KB^2A$$

where $F$ = force
$B$ = magnetic flux density
$A$ = cross-sectional area of the particle
$K$ = constant As the particles of metal build up on pole faces 23a and 25a of measuring cell 12a, the gap length, $\delta_M$, becomes smaller. This occurs only in measuring cell 12a. The initial condition of symmetrical gap length between the measuring and balancing cells is altered and the circuit reluctances are no longer equal. Equations 2 and 3 can be simplified to give:

(9) $$\mathfrak{R}_B = k_1\delta_B + c_1$$
(10) $$\mathfrak{R}_M = k_1\delta_M + c_1$$

The ratio of the fluxes then becomes dependent upon the lengths of the gaps, as shown in the equation:

(11) $$\frac{\phi_M}{\phi_B} = \frac{k_1\delta_B + c_1}{k_1\delta_M + c_1}$$

The voltages induced in the measuring and balancing windings, given in Equation 7, are no longer equal but are given by:

(12) $$\frac{E_M}{E_B} = \frac{k_1\delta_B + c_1}{k_1\delta_M + c_1}$$

By proper design of the magnetic circuits the following condition is obtained:

(13) $$k_1\delta_B \gg c_1$$

(14) $$\frac{E_M}{E_B} \approx \frac{\delta_B}{\delta_M}$$

Equation 14 shows that the relation between the measuring coil induced voltage and the balancing coil induced voltage is dependent upon the ratio of the measuring gap length to the balancing gap length. The balancing gap length does not change, but the measuring gap length becomes smaller as metal is collected in this gap. The resulting difference in the two voltages shows up as a net voltage at the output terminals connected to galvanometer 15. The magnitude of this output voltage bears a direct relation to the amount of metal collected in measuring gap 12a. By calibrating measuring gap 12a with known amounts of suspended metal, the relation between the metal quantity and the voltage magnitude can be expressed as an exact quantitative relation which enables the use of the measuring element in a measuring instrument.

We claim:

1. An instrument for ascertaining the quantity of particles of magnetic material in a fluid stream which comprises a magnetically permeable core member defining a first and a second magnetic flux circuit, a first portion of said core being common to both said first and said second flux circuits, said first portion and a second portion of said core independent of said second flux circuit defining said first flux circuit and said first portion and a third portion of said core independent of said first flux circuit defining said second flux circuit, said core member being discontinuous to define, a gap in said second portion of said core, said core member being discontinuous to define, a gap in said third portion of said core, a first coil about said first portion of said core for generating an alternating magnetic flux in both said first and second flux circuits when energized by said alternating current, a second coil about said second portion of said core for generating an induced alternating voltage upon energization of said first coil by alternating current, a third coil about said third portion of said core for generating an induced alternating voltage upon energization of said first coil by an alternating current and for connection in an external circuit with said second coil to develop a differential in induced voltages, a fourth coil about said second portion of said core for generating a unidirectional magnetic flux in said first flux circuit upon energization by direct current, and means for passing a fluid stream containing magnetic particles consecutively through said first gap and said second gap whereby said particles are collected in said first gap changing the reluctance thereof and thereby changing the differential of induced voltages of said second and third coils as a function of the quantity of magnetic particles in said fluid stream.

2. A gap defined by a discontinuity in a magnetically permeable core member which comprises a pair of spaced, confronting pole faces in said core member, non-magnetic means enclosing the space between said pole faces, a tapered extension on one of said pole faces, an annular disc peripherally in contact with the interior of said enclosing means and positioned coaxially about said tapered extension defining a nozzle for converging fluids introduced into the enclosed space between said pole faces from the base of said tapered extension, means for introducing fluids into said enclosed space at the base of said tapered extension, a cylindrical extension on the other of said pole faces having a flat face confronting said tapered extension and spaced therefrom to intercept a converging stream of fluid passing through said space from said fluid introducing means, and fluid withdrawal means located at the base of said cylindrical extension.

3. A gap defined by a discontinuity in a magnetically permeable core member according to claim 2 in which means are employed to generate an alternating magnetic flux across said gap.

4. A gap defined by a discontinuity in a magnetically permeable core member according to claim 2 in which means are employed to generate an alternating magnetic flux across said gap and in which means are employed to generate a unidirectional magnetic flux across said gap.

5. An instrument according to claim 1 in which each of said first and second gaps is defined by a pair of spaced, confronting pole faces in said core member, non-magnetic means enclosing the space between said pole faces, a tapered extension on one of said pole faces, an annular disc peripherally in contact with the interior of said enclosing means and positioned coaxially about said tapered extension defining a nozzle for converging fluids introduced into the enclosed space between said pole faces from the base of said tapered extension, and a cylindrical extension on the other of said pole faces having a flat face confronting said tapered extension and spaced therefrom to intercept a converging stream of fluid passing through said space from said fluid introducing means.

References Cited in the file of this patent

UNITED STATES PATENTS

| | | |
|---|---|---|
| 2,269,152 | Hathaway | Jan. 6, 1942 |
| 2,315,045 | Breitenstein | Mar. 30, 1943 |
| 2,587,664 | Stout | Mar. 4, 1952 |